United States Patent Office

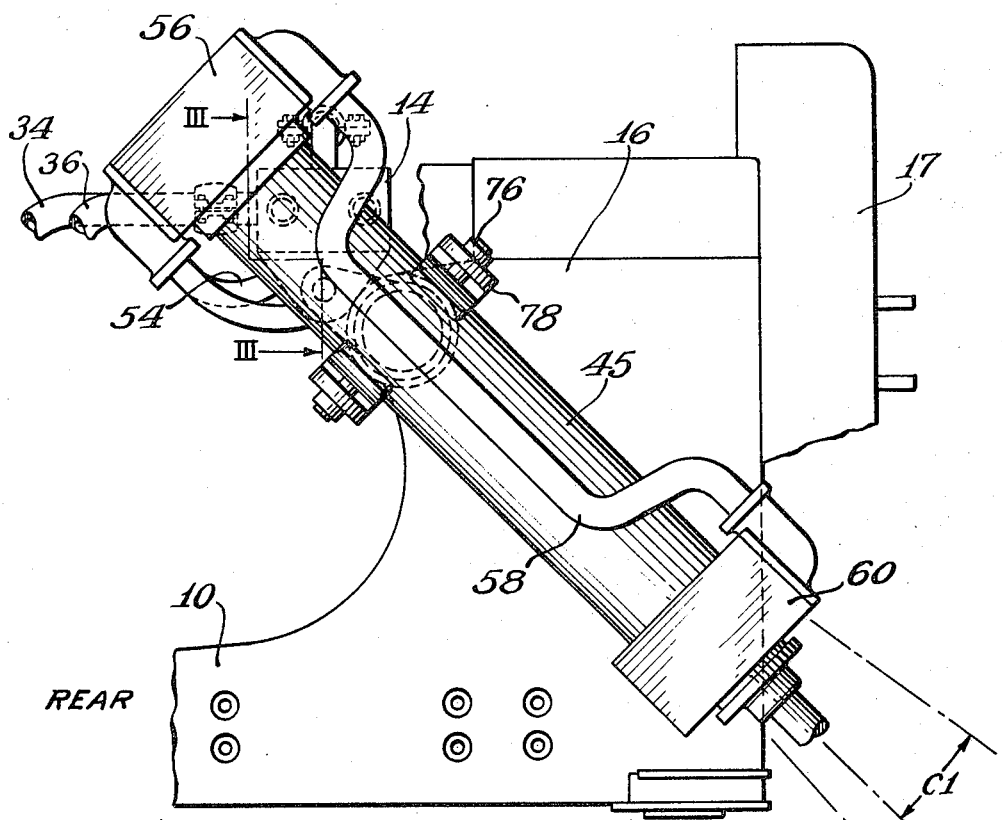
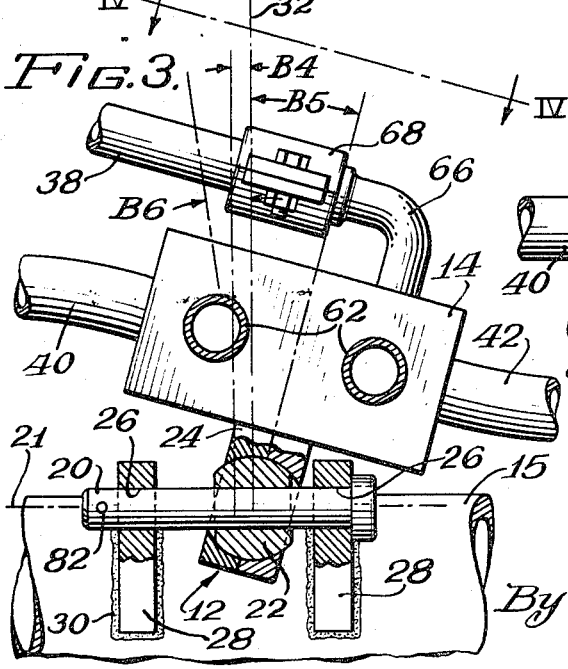
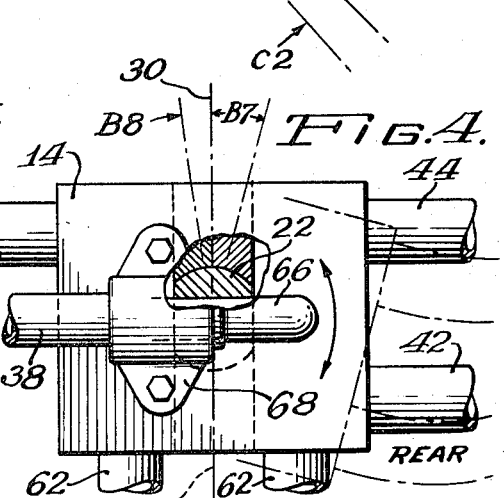

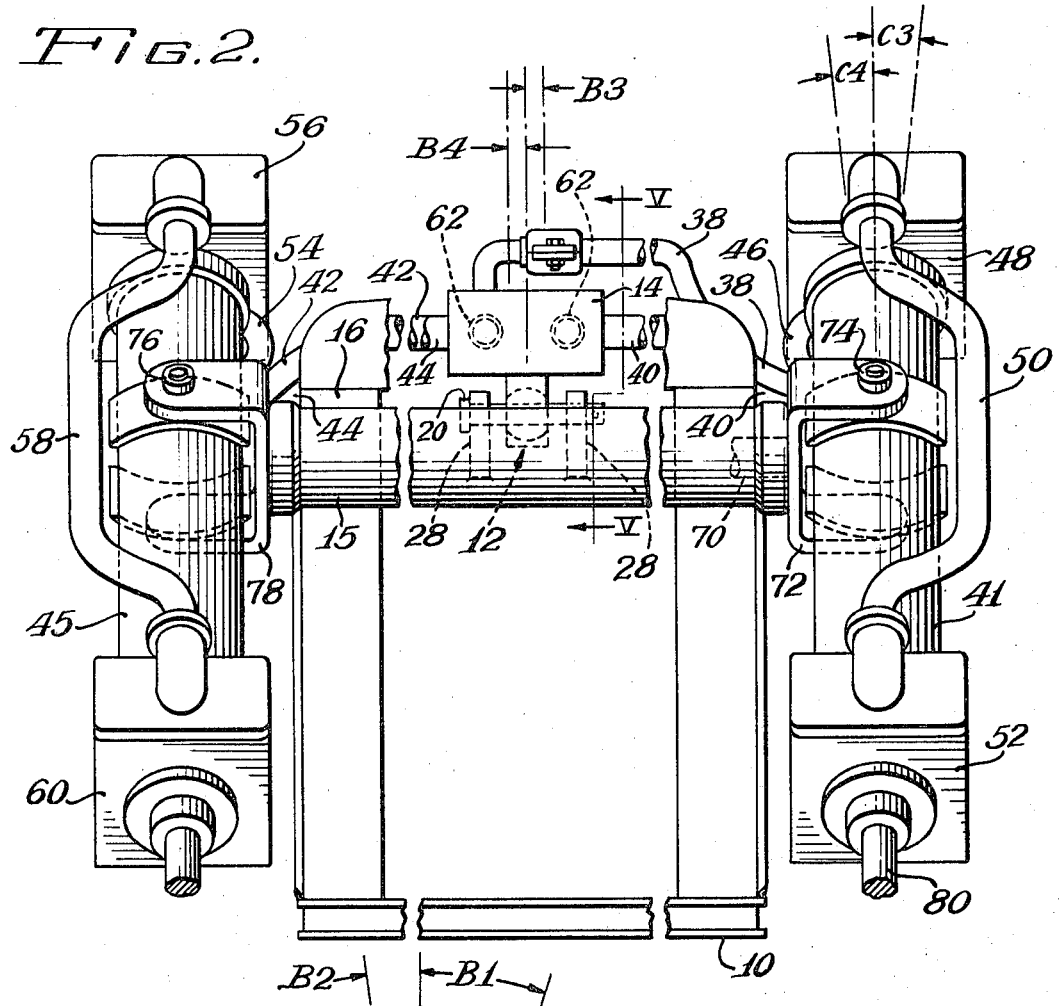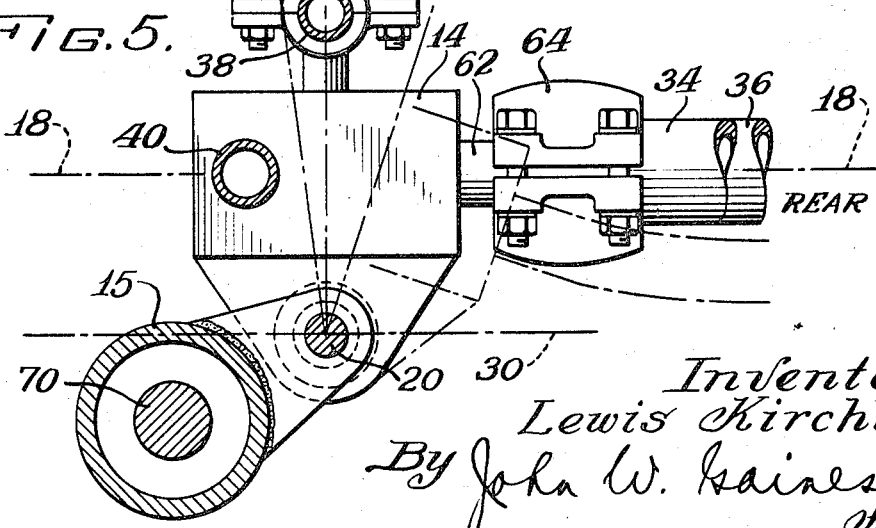

3,422,729
Patented Jan. 21, 1969

3,422,729
HOSE BLOCK SWIVEL
Lewis Kirchler, Skokie, Ill., assignor to International Harvester Company, Chicago, Ill., a corporation of Delaware
Filed Sept. 29, 1966, Ser. No. 582,817
U.S. Cl. 92—146                              10 Claims
Int. Cl. F15b 11/16

ABSTRACT OF THE DISCLOSURE

Bulldozer radiator guard structure having blade hoist cylinders, service line hoses therefor, a junction block swivel intermediate the cylinders and providing four-way freedom of motion, and a central hose junction block supported by the block swivel and hydraulically interconnecting sets of the service line hoses in a way to yield when displaced by hose movement.

---

This application relates to a bulldozer having an hydraulically raised bulldozer blade. It more particularly relates to blade hoist cylinders provided at opposite sides of the bulldozer radiator guard structure, and to a novel block swivel independently mounted at some point intermediate the cylinders, and supporting a common central hose junction block which interconnects sets of the service line hoses that are provided to supply hydraulic fluid simultaneously to the hoist cylinders.

In the drawings:

FIGURES 1 and 2 are respective right side elevational and front plan views showing the hoist portion of a bulldozer embodying the present block swivel invention; and FIGURES 3, 4, and 5 respectively are rear elevational, top plan, and left side elevational views of the block swivel shown in FIGURES 1 and 2.

In a bulldozer, in which bulldozer the blade hoist cylinders have an interconnecting hose junction block mounted in a freely floating relation upon my improved block swivel, and which bulldozer is generally indicated at 10 in the accompanying FIGURES 1 to 5 of drawing, my swivel 12 secures a junction block 14 to a cross support fixed in an elevated position in the vehicle. The specific cross support is actually a gimbal crosstube 15, which is in the lift frame 16 included in a radiator guard structure 17 at the forepart of the vehicle.

The freely floating relation referred to includes freedom of the block 14, having a generally fore and aft extending axis 18 (FIGURES 4 and 5), to bodily slide laterally to the left (B3) and to the right (B4) of the vehicle (FIGURES 2 and 3) along a crosspin 20 which establishes a guide axis 21 and which functions as a guide, to pitch fore (B2) and aft (B1) conjointly with the crosspin 20 (FIGURE 5), which also functions as a pivot pin, to roll to the right (B5) and to the left (B6) in the vehicle on a ball 22 carried by the pin 20 (FIGURE 3), and to yaw to the right (B7) and to the left (B8) in the vehicle (FIGURE 4) on the ball 22.

Because of the easy movement of accommodation of the hose junction block 14, it reacts with infinite adjustment to the applied hose forces, and each resisting hose yields until there is an exact balance of hose twisting and hose bending forces in the system. Under the state of equilibrium which is reached, no hose is under excessive torsion or under excessive compression or tension compared to the others and the chance of hose rupture from those particular causes is minimized. Also, strain and wear become more uniform among the hoses involved. Herein lies one of the technical advantages of my invention, and the importance is apparent.

Swivel

In the structure provided to swivel, a bipartite, symmetrical socket part 24 of the ball joint receives the ball 22 and is affixed at the end of the socket part to the block 14 in the center of the bottom side of the latter. The pin 20 which supports the ball 22 for turning and sliding movement is supported in two registering bearing holes 26 formed in a pair of spaced apart, aligned mounting lugs 28.

The lugs 28 are welded at 30 (FIGURE 3) to the upper rear portion of the gimbal crosstube 15 and were designed in one embodiment of the invention to form an acute vertical angle of approximately 60°.

The ball joint in the swivel 12 has a fore and aft extending reference axis 30 (FIGURES 4 and 5) and a vertical reference axis 32 (FIGURE 3).

Hydraulic

In the hydraulic structure provided, a fore and aft extending pair of lower and lift hoses 34 and 36 is rigidly connected at the front end to the rear of the block 14 (FIGURES 1 and 5). There are pairs of athwartwise extending hoses, one such pair of lift and lower hoses 38 and 40 being disposed between the block 14 and a left hoist cylinder 41, and the other pair of lift and lower hoses 42 and 44 being disposed between the block and a right hoist cylinder 45.

The athwartwise extending lift hose 38 is secured to a rigid fitting, not shown, which is fixed to the cylinder 41 and which is connected by a metal pipe 46 (FIGURE 2) to a cylinder manifold 48 at the top of the left cylinder 41. The lower hose 40 is similarly connected to the cylinder manifold 48 by a pipe, not shown. A full length cylinder tube 50 interconnects the manifold 48 and a cylinder manifold 52 at the bottom of the cylinder 41.

The lift hose 42 is secured to a rigid fitting, not shown, which is fixed to the right cylinder 45, and is connected by a pipe 54 to a cylinder manifold 56 at the top of the right cylinder 45, which cylinder includes a longitudinally extending cylinder tube 58 interconnecting the top manifold 56 and a bottom cylinder manifold 60. The lower hose 44 is connected to the top manifold 56 by a rigid fitting, fixed to the cylinder, and by a metal pipe, not shown. The rigid fittings on the cylinders are fixed in positions rearwardly of and closely adjacent to the yokes, to minimize hose movement when the universally mounted cylinders swing.

The fore and aft extending pair of hoses 34 and 36 establishes communication between the block 14 and a source of high and low pressure, and the block intercommunicates with the respective lift and lower hoses. When high pressure is selectively applied to the fore and aft extending lift hose 36, all lift hoses are pressurized and become semirigid while they are causing the cylinders 41 and 45 to apply a lifting or holding force.

Similarly when the fore and aft extending lower hose 34 is pressurized at high pressure, the other lower hoses 40 and 44 are pressurized, causing the cylinders 41 and 45 to extend and provide a lowering stroke. The hoses are rubber, i.e., an elastomeric material impervious to hydraulic fluid attack and reinforced in the wall.

In each case, the unpressurized hoses are connected through the appropriate hose of the fore and aft extending pair 34 and 36 to a pressure or drain connection in the source. The source includes in the fluid line a lift-hold-lower valve of conventional construction, not shown.

Fitting

In the fitting structure provided, each of the hoses 34 and 36 is connected to a rigid, block-carried tube 62 by means of a clamp fitting 64. The hose is thus rigid in its relation to the block but flexes between its ends in accommodating to movement and to forces.

The lift hose 38 has an individual end connection to a gooseneck tube 66 (FIGURES 3 and 4) by means of a clamp fitting 68, and is thus rigid at that end with respect to the block 14.

It will be understood that straight tubes, not shown, and clamp fittings, not shown, provide similar separate connections between the block 14 and each of the other hoses 40, 42 and 44.

Gimbal

In the gimbal structure provided, the gimbal crosstube 15 carries spaced apart bushings, not shown, in the left end by which it rotatably supports a shaft 70 having a hub carrying a hoist cylinder yoke 72. Two trunnions 74 on the cylinder 41 are received in trunnion mountings on the yoke 72, enabling the left cylinder 41 to be universally mounted in the lift frame. Similarly a pair of trunnions 76 and trunnion mountings on a hoist cylinder yoke 78 universally mount the cylinder 45 at the right end of the gimbal crosstube 15 (FIGURE 2).

Hoist

In the structure provided to hoist, the top and bottom manifolds 48 and 52 of the left hoist cylinder 41, for example, introduce a pressure differential in one direction or the other to a piston, not shown, carried on the end of a piston rod 8 which projects therefrom forwardly and downwardly from the cylinder. The rod 80 is connected at its lower end to one side of a bulldozer blade or bullgrader blade, not shown.

The blade is of standard construction and performs the conventional motion of tipping to or fro about a transversely disposed axis across the vehicle so as to decrease or increase the suction angle of the blade, the motion of rotation in which the blade tilts or untilts about a longitudinal axis, and a reversible lifting motion in which the vehicle operator causes the hoist cylinders 41 and 45 to raise or lower the blade.

In so doing, the left cylinder 41 not only pivots in a vertical plane about the transverse axis of the shaft 70, FIGURES 2 and 5, but also swings in generally horizontal planes so that, in the vicinity of the top manifold 48, the cylinder describes a swing angle C3 or an inwardly swinging angle C4 as viewed by the operator. Throughout any of these motions, the cylinder 45 in the vicinity of its top manifold 56 can remain stationary, or can be moving the same way with or opposite to the cylinder 41.

It is therefore apparent that the hoses, particularly the athwartwise extending hoses 38, 40, 42, and 44 are subjected at their outer ends to torsion and to tension and compression of varying magnitudes. Also, three of the hoses of the three pairs are pressurized at the same time, creating semirigidity and a foreshortening of each hose between its ends. The three pairs converge against the left, right, and rear sides of the block in three mutually perpendicular, confining directions.

The mechanical reaction is communicated to the block 14, which because of the hoses is therefore fixed on its floating swivel with a certain semirigidity, and in a position accommodating freely to and in equilibrium with all hose forces. There is no binding during the free accommodation, and hence the loads are distributed fairly equally among the hoses so that the main loading on the wall of each hose is simply the internal pressure.

In one physically constructed embodiment of the invention, the width of the space between the lugs 28 (FIGURE 3) compared to the width of the widest part of the swivel 12 was in a ratio of about 4:3. The outside diameter of the ball part 22 in the ball joint, compared to the diameter of the pivot pin 20 passing through the ball part, was in the ratio of about 2:1. A cotter pin 82 at one end of the crosspin 20 and an enlarged head at the other end anchors the pin against axial movement when the ball 22 slides therealong.

Various displaced positions of the hose block 14 are shown or suggested by the broken line illustrations thereof and by the attitudes of the miscellaneous axes illustrated in FIGURES 2 to 5, inclusive.

What is claimed is:

1. In a vehicle having two, generally fore and aft extending, hydraulic hoist cylinders individually universally mounted thereon, said cylinders having hydraulic hoses converging therefrom to a juncture point between the cylinders and adjacent a support:
    a hose junction block at said point common to the hoses;
    means for mounting the block to said support for freedom of movement including bodily sliding in a direction athwartwise of the vehicle, comprising a support-connected crosspin extending athwartwise of the vehicle;
    a spherical ball joint interconnecting the pin and the block comprising a ball part on the pin mounted to rotate therewith on the pin axis and to slide relative thereto along said axis; and
    a block-connected socket part on the ball part mounted to twist and to tilt relative thereto.

2. The invention of claim 1, characterized by pairs of the hoses:
    a plurality of such hoses leading from points fixed in closely spaced adjacency to the universally mounted portion of each cylinder, said plurality of hoses converging athwartwise from opposite directions to the junction block and having substantially rigid means of securement thereto;
    said block accommodating to the stresses, being mutually exerted by the hoses in opposite directions, because of bidirectional freedoms of movement of the block to pitch and to laterally slide, bodily along the pin, and because of third and fourth bidirectional freedoms of movement to yaw about a substantially vertical axis through the ball and to roll about a generally fore and aft axis passing through the ball.

3. The invention of claim 2 including the support, and characterized by:
    a gimbal crosstube;
    a hoist cylinder yoke and a gimbal trunnion hub secured to the universally mounted portion of each cylinder;
    the two yokes being mounted by the hubs for turning, independently of one another, in opposite ends of the gimbal crosstube.

4. The invention of claim 3 including the converging hoses in pairs and further hoses, the further hoses provided in a pair characterized by:
    lift and lower hoses for transmitting fluid in fore and aft directions between a source of high and low pressure and the junction block and having rigid means of securement to the latter;
    the pairs of hoses mutually perpendicularly converging against the sides of the block in the plane of the block, the hose semi-rigidity fixing the block at all times in a position in accommodation to, and in balance with, the applied hose forces.

5. The invention of claim 1, including the converging hoses and further hoses and characterized by:
    pairs of the hoses engaging the block in at least three directions in the plane of the block;
    the mounting means being vertically upstanding beneath the block and furnishing thereto an essentially floating mounting;
    said block, attendant with and in accommodation to the stresses exerted by a plurality of the hose pairs, having on the floating mounting, freedom to pitch fore and aft and to bodily slide athwartwise, freedom to yaw about a substantially vertical axis through the ball, and freedom to roll about a generally fore and aft axis passing through the ball.

6. The invention of claim 5, the crosspin support characterized by:

a gimbal crosstube having spaced-apart, pin carrying lugs upstanding thereupon at no more than about an acute vertical angle;

said ball and socket parts being in the space between the spaced lugs, the space being wider than the width of the parts in the ratio of at least about 4:3.

7. The invention of claim 1, including the support characterized by:

a crosstube; and spaced-apart lugs carried by the crosstube and carrying the crosspin;

the outside diameter of said ball part compared to the diameter of the crosspin therein being in the ratio of about 2:1.

8. The invention of claim 7, characterized by:

said ball and socket parts being in the space between the spaced-apart lugs, such space compared to the width of the widest part being in the ratio of at least about 4:3.

9. In an hydraulically equipped vehicle having a hose junction block and a support vertically related to one another with a space therebetween:

means in said space for interconnecting the block and support, comprising generally upstanding swivel means beneath the block for furnishing thereto an essentially floating mounting on the support;

said swivel means comprising support-connected, appreciably spaced apart lugs projecting in the same direction at an acute vertical angle;

a block-connected ball joint comprising a socket part mounted to twist and to tilt, and a ball part therein; and a pivot pin interconnecting the ball part and the lugs so as to accommodate rotation of the ball part with, and about the axis of, the pivot pin, the ball part and pivot pin being slidably related to one another to accommodate relative sliding of the ball part on the pin along said axis.

10. The invention of claim 9, characterized by:

said ball and socket parts being in the space between the lugs, the width of the space in comparison to the width of the widest part being in a ratio of about 4:3;

the outside diameter of said ball part compared to the diameter of the pivot pin therein being in the ratio of about 2:1.

References Cited

UNITED STATES PATENTS

| 2,160,595 | 5/1939 | Bleu | 37—144 |
| 2,624,131 | 1/1953 | Rockwell | 37—144 |
| 2,766,079 | 10/1956 | Browne. | |
| 2,787,065 | 4/1957 | Bock et al. | 37—144 |
| 2,798,688 | 7/1957 | Affleck | 92—161 X |
| 3,234,670 | 2/1966 | Fryer et al. | 37—144 |

FOREIGN PATENTS

| 791,555 | 3/1958 | Great Britain. |

MARTIN P. SCHWADRON, *Primary Examiner.*

I. C. COHEN, *Assistant Examiner.*

U.S. Cl. X.R.

287—88, 100; 285—62; 172—809